United States Patent [19]

Yaniv et al.

[11] Patent Number: 4,593,199
[45] Date of Patent: Jun. 3, 1986

[54] OPTICAL-TO-OPTICAL IMAGE TRANSDUCER CAPABLE OF ACCEPTING X-RADIATION

[75] Inventors: Zvi Yaniv, Southfield; Robert R. Johnson, Franklin, both of Mich.

[73] Assignee: Energy Conversion Devices, Inc., Troy, Mich.

[21] Appl. No.: 692,964

[22] Filed: Jan. 22, 1985

[51] Int. Cl.$^4$ ............................................. H05B 33/00
[52] U.S. Cl. ............................ 250/484.1; 250/213 VT
[58] Field of Search ......... 250/213 R, 213 VT, 484.1; 350/330

[56] References Cited

U.S. PATENT DOCUMENTS

| | | | |
|---|---|---|---|
| 3,659,149 | 4/1972 | Fleming | 250/484.1 |
| 3,829,684 | 8/1974 | Assouline et al. | 250/484.1 |
| 3,971,931 | 7/1976 | Jehle | 250/484.1 |
| 4,485,389 | 11/1984 | Ovshinsky et al. | 357/2 |

OTHER PUBLICATIONS

W. P. Bleha, "Progress in Liquid Crystal Light Valves," *Laser Focus/Electro-Optics* magazine, Oct. 1983 issue, pp. 111–120.

*Primary Examiner*—Janice A. Howell
*Attorney, Agent, or Firm*—Lawrence G. Norris; Robert S. Nolan; Richard O. Gray, Jr.

[57] ABSTRACT

A device and method for converting an X-ray image into a corresponding output image with light from a different source and a phosphorescent layer in conjunction with a liquid crystal light valve. The light valve includes a photosensor layer comprised of a deposited semiconductor material having distinct light and dark photoconductivities, the light photoconductivity being substantially greater than the dark photoconductivity.

When impinged upon by an particular pattern of X-rays, the phosphorescent layer phosphoresces in a corresponding pattern, which phosphorescence in turn causes the semiconductor layer to be switched to its light photoconductivity in a pattern also corresponding to that of the input X-ray image. The pattern of switched semiconductor in the photosensor layer allows a biasing voltage to be switched over to the liquid crystal layer of the light valve in a corresponding pattern. This voltage pushes the liquid crystal over its electro-optic threshold thereby inducing an output image corresponding to the original input image.

9 Claims, 2 Drawing Figures

OPTICAL-TO-OPTICAL IMAGE TRANSDUCER CAPABLE OF ACCEPTING X-RADIATION

BACKGROUND OF THE INVENTION

The liquid crystal light valve (LCLV) is an optical-to-optical image transducer that is capable of accepting a low-intensity visible light image and converting it, in real time, into an output image with light from another source. Such devices have been used for optical data processing applications in large-screen projector displays.

The LCLV generally consists of a photoconductor or photosensor film or layer, and a liquid crystal layer. The two layers are separated by a light-blocking layer and a dielectric mirror. Adjacent the outer surfaces of the liquid crystal and photosensor layers are two transparent electrodes connected to a voltage source. The voltage source and electrodes serve to maintain a bias voltage across the photosensor and liquid crystal layers. Finally, a glass substrate is generally provided over each of the transparent electrodes connected to a voltage source.

The photosensor film, generally cadmium sulfide, serves as an imaging, light-controlled, voltage modulator for the liquid crystal layer. In response to the input light pattern, the photosensor impedance is lowered, thereby switching the bias voltage to the liquid crystal layer. This causes the liquid crystals to realign in a pattern corresponding to the light input image intensity by locally driving the liquid crystal layer above its electro-optic threshold. For real-time response, a liquid crystal layer between 2 and 6 microns thick is generally used.

The LCLV is often employed with liquid crystal molecules having a twist of 45° rather than the conventional 90° of typical twisted-nematic liquid crystal displays. This is because the 90° twisted-nematic does not modulate the intensity of the light beam effectively when both the polarizer and the crossed analyzer are on the same side of the liquid crystal, as is generally required in the reflection-mode light valve operation. A twist angle of 45° gives the maximum modulation effect.

A LCLV having a photosensor layer comprised of cadmium sulfide, has a characteristic spectral input response having a peak photoresponse at 515 nm in the green. Thus, such a light valve is well suited to accept input from certain CRT phosphors as well as a 514 nm argon-ion laser line. In fact, one of the most widely used means of addressing an LCLV is a fiberoptic CRT output which is optically coupled with optical matching fluid to a fiberoptic input window on an LCLV.

When addressed with a laser, very high resolution is possible because of the well-defined shape of the laser beam as compared to the Gaussian spot shapes from a CRT. Line widths of 0.5 mils projected from the LCLV have been achieved, corresponding to a 2,000 TV-line display.

The present invention adds a new dimension to prior art LCLV technology by achieving for the first time the conversion of X-ray images into corresponding output images with light from another source. The advantages of such a device, such as employing the LCLV in medical diagnostic radiology, are obvious.

SUMMARY OF THE INVENTION

The present invention provides a device and method employing a liquid crystal light valve for converting an X-ray image into a corresponding output image with light from another source. The device includes a liquid crystal layer and a photosensor layer with a dielectric mirror therebetween. The device also includes two transparent electrodes, one each disposed adjacent respective opposite sides of the photosensor and the liquid crystal layer and at least one transparent substrate over the electrode which is adjacent the liquid crystal layer and opposite the photosensor layer.

A voltage source is utilized to apply a bias voltage across the electrodes, and a phosphorescent layer is supplied adjacent the photosensor opposite the liquid crystal layer. The phosphorescent layer will phosphoresce locally in response to the corresponding pattern of excitation produced by X-radiation impinging thereupon.

The photosensor layer is preferably comprised of a deposited semiconductor material having both a light and a dark photoconductivity, the light photoconductivity being substantially greater than the dark photoconductivity. Such a layer will switch from dark to light photoconductivity in a pattern corresponding to the local phosphorescence mentioned above when impinged upon by the phosphorescence.

The pattern of the now light-photoconductive photosensor will cause the bias voltage to be switched over to the liquid crystal layer in a corresponding pattern which will push the liquid crystal layer over its electro-optic threshold in a similar pattern. In this way, a subsequent realignment of liquid crystals and a concomitant light emission in a pattern corresponding to the pattern of the original X-ray input are achieved.

DESCRIPTION OF THE PREFERRED EMBODIMENTS

Figure 1:
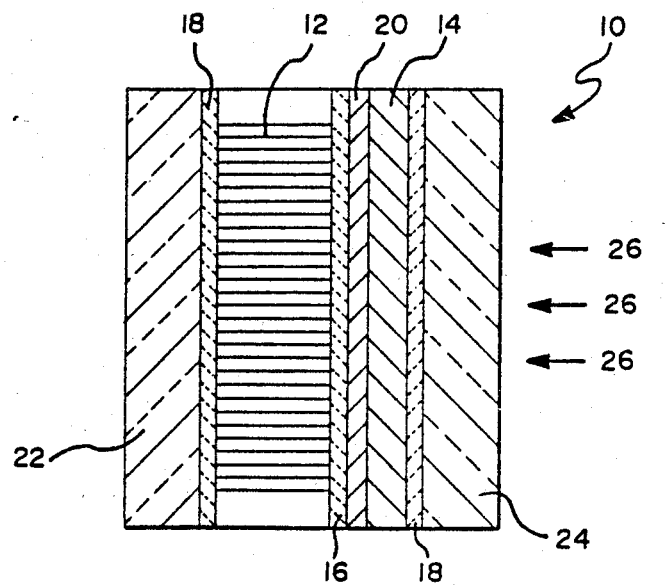
FIG. 1 is a cross-sectional schematic view of a prior art liquid crystal light valve.

Referring now more particularly to FIG. 1, there is illustrated a cross-sectional schematic view of a prior art liquid crystal light valve (LCLV) 10. LCLV 10 includes a liquid crystal layer 12, a photosensor or photoconductor layer 14 and a dielectric mirror 16 therebetween. LCLV 10 also includes transparent conductive electrodes 18, a light blocking layer 20 between photosensor 14 and dielectric mirror 16, an optical glass substrate 22, which may also perform a polarizing function, and a fiberoptic or glass face plate 24.

Photoconductor film 14 often comprises cadmium sulfide (CdS) and acts as an imaging, light controlled voltage modulator for the liquid crystal layer 12. Dielectric mirror 16 is preferably of a broad spectral band type and serves to reflect modulated readout light. Light blocking layer 20 serves the related function of preventing residual readout light from impinging on photosensor 14. Transparent electrodes 18 are connected to a voltage source (not shown) for maintaining a bias voltage across electrodes 18.

Generally, the function of device 10 is as follows. Any particular pattern of light is input as at arrows 26. In response to the light, the impedance of photosensor layer 14 is lowered locally in a pattern corresponding to that of the light input.

The patterned lowered impedance of photosensor 14 causes the bias voltage to be switched to liquid crystal layer 12 in a similar pattern. The bias voltage now applied to liquid crystal layer 12, in a pattern corresponding to the pattern of lowered impedance in photosensor layer 14 which in turn corresponds to the pattern of light input, drives layer 12 above its electro-optic threshold in a pattern that similarly corresponds to the input pattern. Typical operating voltage levels are 10 V rms at 10 kHz. In this manner, realignment of liquid crystals with the attendant light emission in a pattern corresponding to the pattern of the original input is achieved.

The LCLV 10 described above will have the characteristic spectral input response of the CdS photosensor layer 14, the peak photoresponse being around 515 nm in the green. Therefore, LCLV 10 is well adapted for accepting input from a 514 nm argon-ion laser line or certain CRT phosphors. If LCLV 10 is to be manufactured with a fiberoptic faceplate input window 24, this would allow direct coupling with a fiberoptic faceplate CRT for a compact unit. LCLV 10 may also be addressed by, for example, image intensifiers and direct image sensing.

Figure 2:
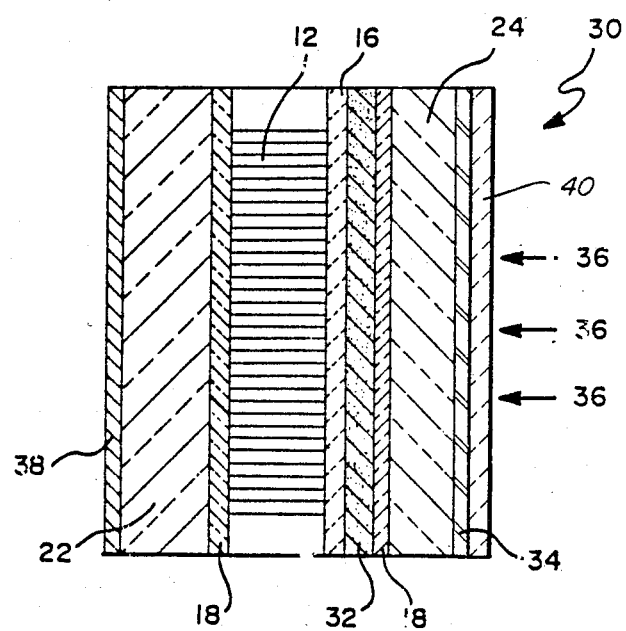
FIG. 2 is a cross-sectional schematic view of a preferred embodiment of the present invention.

Referring now more particularly to FIG. 2, there is illustrated a cross-sectional schematic view of a preferred embodiment 30 of the present invention. Like structures have been referenced by like numerals in both FIGS. 1 and 2. Accordingly, embodiment 30 includes a liquid crystal layer 12, dielectric mirror 16, transparent conductive electrodes 18, a glass substrate 22 and a faceplate 24. All of these structures function generally as described above with respect to FIG. 1.

Embodiment 30 also includes a photosensor/photoconductor layer 32 which preferably comprises a deposited semiconductor material. The semiconductor material has both a light and a dark photoconductivity with the light photoconductivity being substantially greater than the dark photoconductivity, the difference being one of orders of magnitude. For such a semiconductor material, for example, the light resistivity may be approximately $10^8$ ohm-cm and the dark resistivity may generally be greater than $10^{11}$ ohm-cm. An example of a deposited semiconductor material suitable for utilization in the instant invention is described and claimed in U.S. Pat. No. 4,226,898 issued Oct. 7, 1980 to Stanford R. Ovshinsky and Arun Madan for Amorphous Semiconductors Equivalent To Crystalline Semiconductors Produced By A Glow Discharge Process and copending U.S. Pat. No. 4,485,389 issued Nov. 27, 1984 to Stanford R. Ovshinsky and Masatsugu Izu for Amorphous Semiconductors Equivalent To Crystalline Semiconductors, both of which are incorporated herein by reference. As described and claimed in the aforementioned patents, the deposited semiconductor material has a density of localized states so reduced as to be approximately equivalent to the corresponding crystalline material. As a result, such materials have a number of the favorable attributes of crystalline materials, such as a high photoconductivity, and therefore can be most useful in devices such as described and claimed herein.

Such materials generally contain silicon or germanium and certain elements included to alter the electronic configurations of the material to reduce the density of localized states in the energy gap. Such alterant elements may be hydrogen and/or fluorine.

Since the density of localized states is reduced, these materials may be readily modified or doped to change the electronic configurations thereof to introduce different localized states in the energy gap. The modifier elements which may be employed can operate to sensitize, or enhance, the photoconductivity of the deposited material. Such modifier elements can include sensitizing agents such as zinc, copper, gold, silver, and manganese. As is well known in the art, modifier elements like those just mentioned may be used to optimize deposited amorphous semiconductor material to have excellent quantum efficiency in the near blue portion of the visible spectrum, which includes green light. Thus, photosensor layer 32, when made from such optimized amorphous semiconductor material, may be said to have a maximum quantum efficiency in the green region of the visible spectrum.

In addition to the deposited semiconductor layer 32, the present invention, as illustrated in FIG. 2, includes a phosphorescent layer 34 on the side of faceplate 24 opposite semiconductor layer 32. Phosphorescent layer 34 is preferably one which emits light in the green portion of the spectrum as a result of X-radiation impinging thereon.

When impinged upon by a particular pattern of X-rays, as shown by arrows 36 in FIG. 2, phosphorescent layer 34 will phosphoresce in a pattern similar to that of the impinging X-rays. The pattern of phosphorescence will traverse transparent faceplate 24 and the electrode 18 on the same side of the device 30 and impinge on semiconductor layer 32.

The light intensity of the phosphorescent pattern will cause semiconductor layer 32 to switch to its light photoconductivity at local areas corresponding to the pattern of phosphorescence and therefore also corresponding to the original pattern of incident X-radiation. The now switched areas of higher, light conductivity of semiconductor layer 32 will cause the bias voltage maintained across electrodes 18 by a voltage source (not shown) to switch to liquid crystal layer 12. The bias voltage will push liquid crystal layer 12 over its electro-optic threshold in a pattern corresponding to the pattern of switched deposited semiconductor. In this way, a realignment of portions of liquid crystal layer 12 in a pattern corresponding to the pattern of original X-ray input, and a concomitant light emission in the same pattern, are achieved.

Finally, as shown in FIG. 2, an antireflecting coating 38 may be employed over substrate 22.

Modification and variations may be made without departing from the spirit and essence of the invention. For example, phosphorescent layer 34 may be in direct contact with deposited semiconductor layer 32. Further, with either such an embodiment or the embodiment described in detail above, a reflective coating 40 might be added over the phosphorescent layer in order to increase the intensity of the phosphorescent light incident upon semiconductor layer 34 as shown in FIG. 2 32.

In view of the discussion above, what is described and claimed to be secured by Letters Patent of the United States is:

1. A liquid crystal light valve for accepting and transducing X-radiation, comprising:
   a layer of liquid crystal for modulating readout light;
   a dielectric mirror disposed on one side of said liquid crystal layer for reflecting modulated readout light;
   a photosensor layer disposed adjacent said dielectric mirror and opposite said liquid crystal layer, said photosensor comprising a deposited semiconductor material, said material having a light photoconductivity substantially greater than its dark photoconductivity;

at least two transparent electrodes for receiving a bias voltage and applying it across said liquid crystal layer and said photosensor layer, one each disposed adjacent respective opposite sides of said photosensor and liquid crystal layers;

at least one transparent substrate layer, said substrate layer being disposed adjacent the transparent electrode which is on the side of said crystal layer opposite said photosensor layer; and a phosphorescent layer, disposed adjacent said photosensor layer and opposite said liquid crystal layer for phosphorescing locally in a pattern corresponding to X-radiation incident thereupon, said local phosphorescence in turn stimulating a local increase in the photoconductivity of said semiconductor material, thereby resulting in local polarization of, and subsequent corresponding light emission from, said liquid crystal layer.

2. The light valve of claim 1 further including a reflective coating adjacent said phosphorescent layer and opposite said photosensor layer for increasing the intensity of the light from the phosphorescent layer incident on the photosensor.

3. The light valve of claim 1 wherein said deposited material is an amorphous semiconductor and has a maximum quantum efficiency in the green region of the light spectrum.

4. The light valve of claim 3 wherein said phosphorescent layer locally emits green light at points stimulated by X-radiation.

5. The light valve of claim 1 further including a second transparent glass substrate between said photosensor layer and said phosphorescent layer.

6. The light valve of claim 1 wherein the dark resistivity of said semiconductor material is generally greater than $10^{11}$ $\Omega$-cm and the light resistivity is approximately $10^8$ $\Omega$-cm.

7. The light valve of claim 1 wherein said liquid crystal layer is between approximately 2 and 6 microns thick.

8. A method of accepting an X-radiation image and converting same into a corresponding output image with light from another source comprising:
   providing an X-ray image;
   causing said X-ray image to impinge on a phosphorescent screen so that said screen phosphoresces locally corresponding to the pattern of said impinging X-ray image;
   causing said local phosphorescence to impinge upon a layer of deposited semiconductor material, said material being capable of being switched between a dark photoconductivity and a light photoconductivity, said light photoconductivity being substantially greater than said dark photoconductivity, so that portions of said material corresponding to said local phosphorescence switch to said light photoconductivity; and
   applying a bias voltage across said semiconductor layer and a liquid crystal layer so that a current will be conducted by those areas of said semiconductor material which are switched to the light photoconductivity and thereby cause a polarization and light emission from said liquid crystal layer at points corresponding to said switched areas of said semiconductor material.

9. The method of claim 8 further comprising the step of providing a reflective coating for increasing the light intensity of said local phosphorescence impinging upon said semiconductor material.

* * * * *